Feb. 14, 1950　　　W. H. SALE　　　2,497,417
RAILWAY BRAKE BEAM MOUNTING
Filed Nov. 12, 1947　　　3 Sheets-Sheet 1
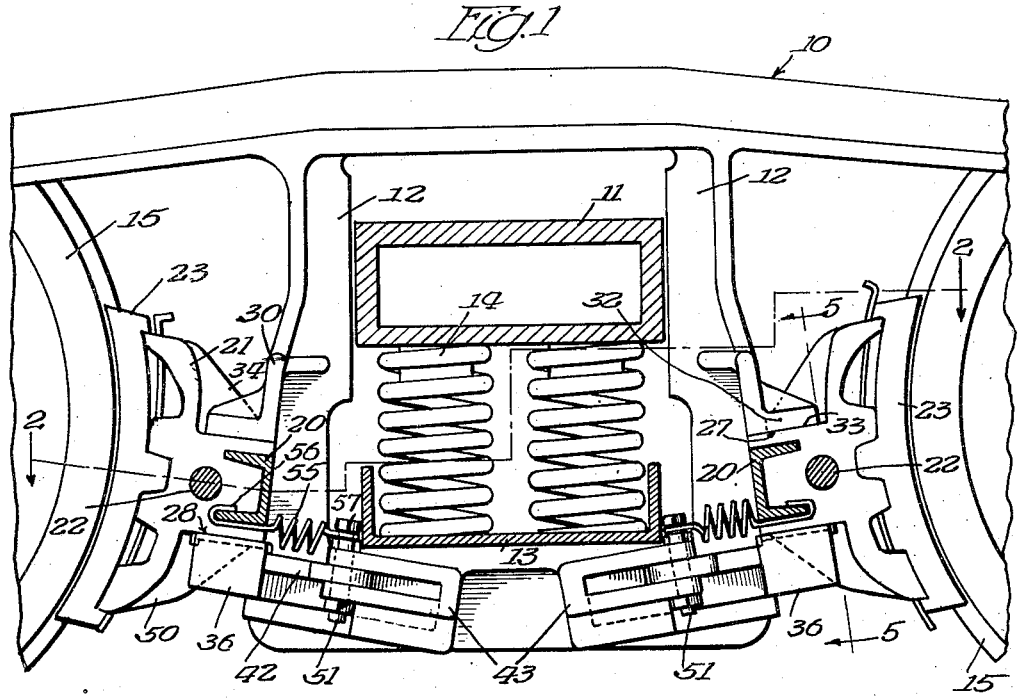
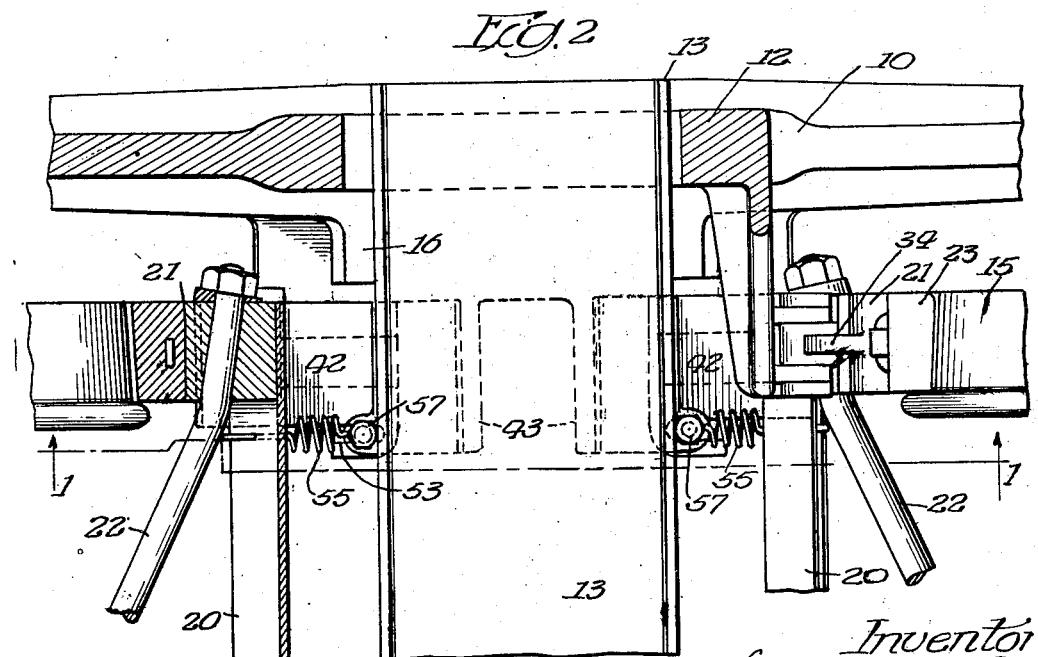
Inventor
William H. Sale
By Fred Gerlach
his Atty.

Feb. 14, 1950 W. H. SALE 2,497,417
RAILWAY BRAKE BEAM MOUNTING
Filed Nov. 12, 1947 3 Sheets-Sheet 2
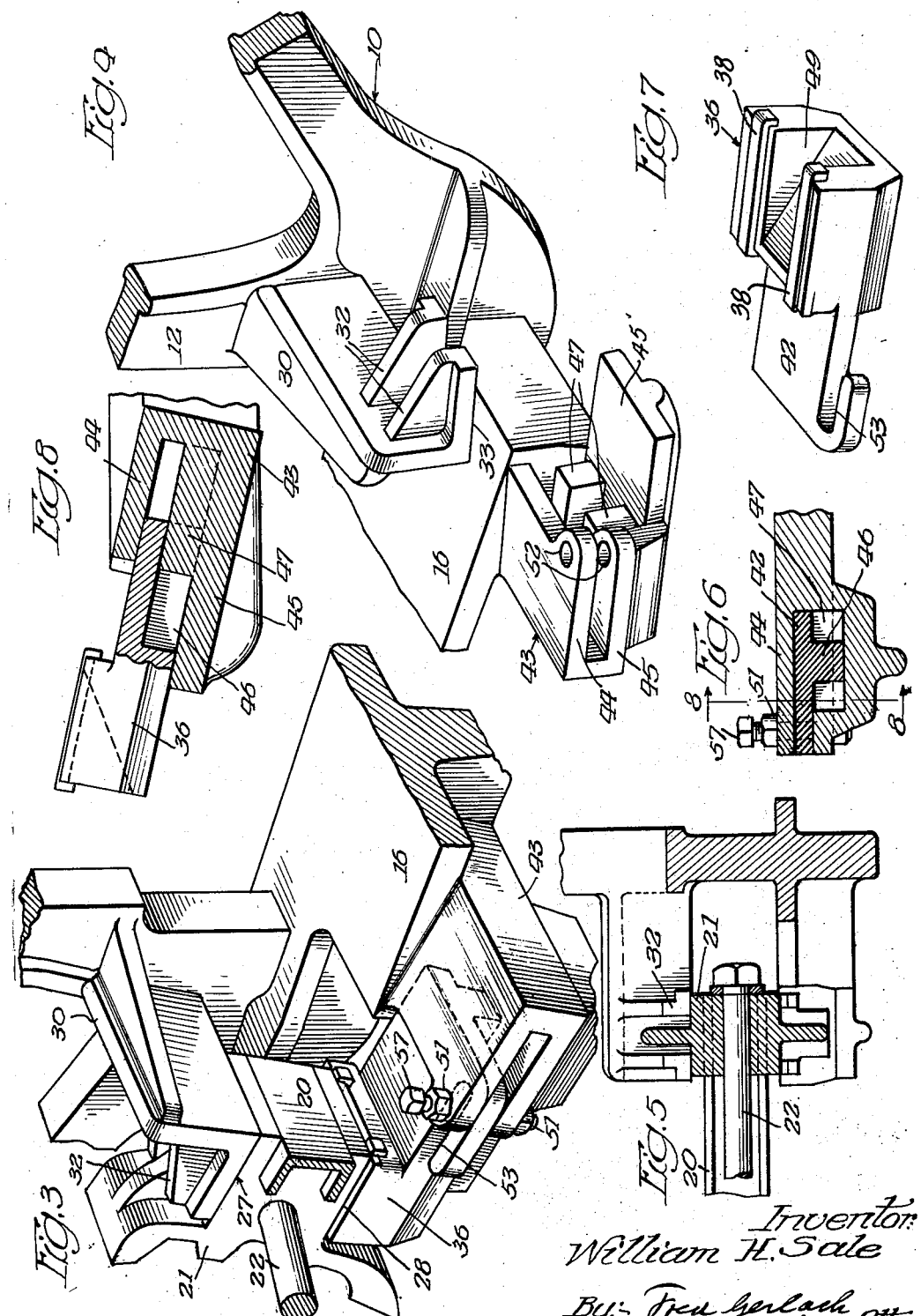
Inventor:
William H. Sale
By: Fred Gerlach
his Atty.

Feb. 14, 1950 W. H. SALE 2,497,417
RAILWAY BRAKE BEAM MOUNTING
Filed Nov. 12, 1947 3 Sheets-Sheet 3

Fig.8ᵃ

Inventor
William H. Sale
By Fred Gerlach
his Atty

Patented Feb. 14, 1950

2,497,417

UNITED STATES PATENT OFFICE 2,497,417

RAILWAY BRAKE BEAM MOUNTING

William H. Sale, Sanston, Va., assignor of one-half to Edward P. Kelly, Chicago, Ill.

Application November 12, 1947, Serial No. 785,299

16 Claims. (Cl. 188—212)

The invention relates to brake-beam supports in railway truck structures.

One object of the invention is to provide improved means for supporting a brake-beam which facilitates its placement in operative relation to the truck-wheels and its removal for repair or replacement.

Another object of the invention is to provide a construction which includes upper and lower bearings between which the brake-head is slidably mounted, for movement to and from the car-wheel, the lower bearing being slidably supported in an extension on an abutment of the side-frame which functions as a support for the cushion springs in the trucks, for clearing the brake-head for placement in its operative position and its removal.

The invention consists in the several novel features of construction hereinafter described and more particularly defined by claims at the conclusion hereof.

In the drawings:

Fig. 1 is a longitudinal section of the truck, taken on line 1—1 of Fig. 2.

Fig. 2 is a section taken on line 2—2 of Fig. 1.

Fig. 3 is a sectional perspective, viewed from the inner side, of one of the brake-heads and the bearings in which it is slidably mounted.

Fig. 4 is a sectional perspective, viewed from the outer side, of the upper bearing for the brake-head and the support for slidably supporting the lower bearing.

Fig. 5 is a section taken on line 5—5 of Fig. 1.

Fig. 6 is a section taken on line 6—6 of Fig. 1.

Fig. 7 is a perspective of the lower bearing for the break-head.

Fig. 8 is a section taken on line 8—8 of Fig. 6.

Fig. 8a is a longitudinal section illustrating another form of the invention.

Figure 9:
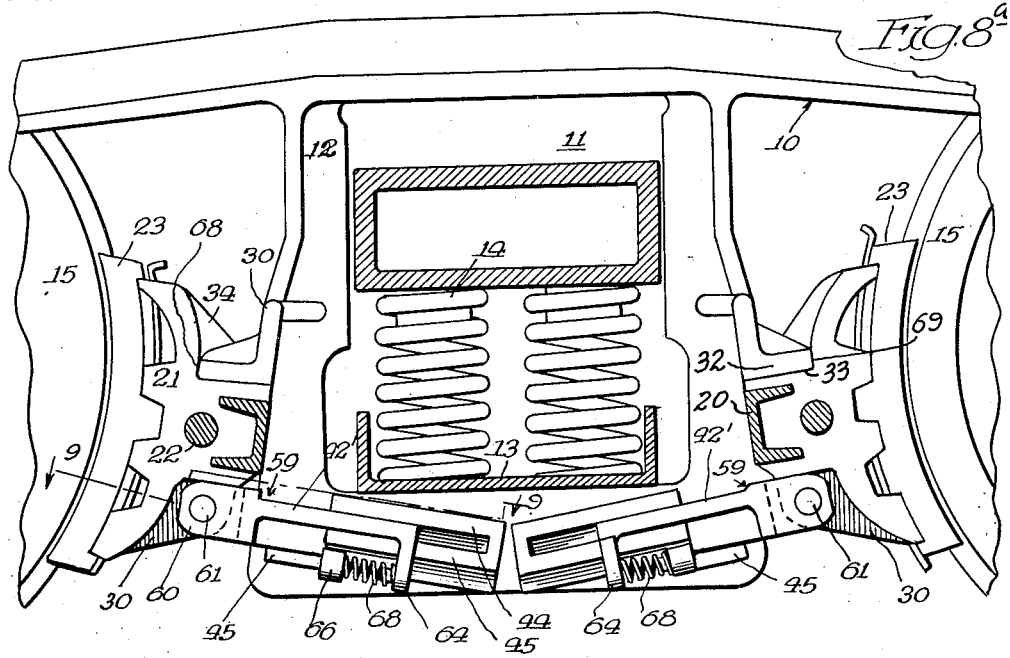
Fig. 9 is a section taken on line 9—9 of Fig. 8.
Figure 10:
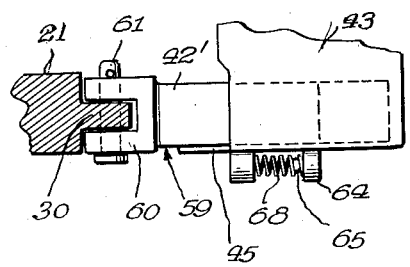
Fig. 10 is a perspective illustrating the lower bearing for the brake-head disconnected from the brake structure and retracted for its removal.
Figure 11:
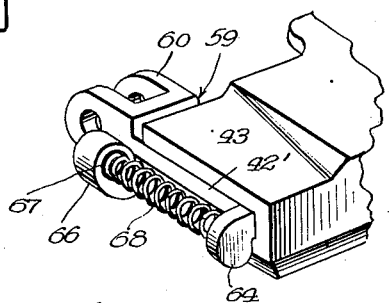
Fig. 11 is a perspective of the retractable bearing for the brake-head.
Figure 12:
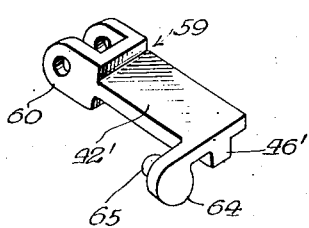
Fig. 12 is a perspective of lug attached to the guide bracket for the lower bearing, which functions as an abutment for the spring for moving the brakeshoe away from the car-wheel.

The invention is exemplified in one side of a railway truck structure which comprises a cast side-frame 10, which includes integral pedestal 12 between which a bolster 11 is vertically movable, truck-springs 14, a plank 13 supported on the wall at the bottom of the openings between said pedestals and integral inward extensions 16 on the side-frame, truck wheels 15 and a brake-beam which comprises a compression-beam bar of channel cross-section 20, a head 21 fixed on each end of bar 20, a tension-member or rod 22 between head 21, and a brake-shoe 23 on each head 21.

A device for slidably supporting the brake structure for movement of the brake-shoes 23 to and from the wheels 15 and which readily permits detachment of the brake structure from the truck is provided at each end of the brake-structure and these are alike in construction, so that it has been deemed sufficient to illustrate the devices at one of said ends.

Each of said supporting devices comprises a slide-bearing including an upper member integral with the side-frame, and a lower member which is retractible to clear the brake-head 21 for its removal from the truck and is slidably supported by an integral inward extension on the side-frame. The brake-head 21 is provided with an upper bearing face 27 and a parallel lower bearing face 28. The bearing member for the upper face 27 of head 21 includes a pair of arms or lugs 32 which are integral with a transversely inwardly extending braket 30 which is integral with side frame 10. Arms or lugs 32 are provided with an underface 33 which fits on the upper bearing-face 27 on the brake-head 21. Arms or lugs 32 are spaced apart to receive the reinforcing web 34 on the upper portion of head 21. The lower bearing functions as a retractible support for the brake-head and comprises an outer member 36 which is provided on its upper face with wear-strips 38 on which the lower bearing face 28 of the brake-head is slidable, and an inward extension or stem 42. The retractible lower bearing is slidably supported in a braket 43 which is integral with and extends transversely inward from the extension 16 of the side-frame 10. Bracket 43 extends under the plank 13 and comprises upper and lower walls 44 and 45 with a channel between them in which an extension 42 of the lower bearing is slidably confined. Extension 42 is provided with a central longitudinal rib 46 so as to be T-shaped in cross-section and guide-ribs 47 for rib 46 are integrally formed on the top of lower wall 45. The lower portion of bracket 43 has an extension 45' for supporting the outer portion of the retractible bearing in its operative position. This construction supports the lower bearing for rectilinear sliding movement in bracket 43 longitudinally of the side-frame. The extension 42 of the lower bearing and the guide-channel in bracket 43 are positioned to guide said bearing in a plane at an angle of 10° to 15° from the horizontal, to aid in moving the brake-structure away from the car-wheels. The member 36 of the lower bearing is cut away as at 49 to receive the lower reinforcing flange 50 on brake-head 21.

The lower bearing is secured in its operative position by a bolt 51 which extends through aligned holes 52 in upper and lower walls 44, 45 of bracket 43 and a slot 53 in one side of extension 42 of the lower bearing and is adapted to clamp said extension between walls 44 and 45. The corner of the upper member of bracket 43 adjacent the hole 52 therein is slightly flexible so that the bolt 57 when tightened will cause said corner to jam the extension 42 of bracket 36 between the walls 44, 45 of bracket 43. When the bolt is released, the extension 42 of the lower bearing will be free to slide into the channel in bracket 43 a sufficient distance to retract the outer member 36 of the lower bearing, for dropping the brake-beam structure from the truck.

A spring 55 is applied to each end of the brake-beam for yieldingly holding the brake-shoes 23 away from the wheels 15. Spring 55 is provided with a hook 56 at one of its ends for engaging one of the flanges of the brake-beam 20 and a loop at its other end for engaging a grooved stud 57 on the upper end of bolt 51.

The operation will be as follows: In mounting the brake-beam structure in the truck, the lower bearings for the brake-head will be retracted to provide clearance for the upward movement of the brake-heads into operative position with their bearing faces 27 engaging arms 32 of the upper bearings. When the brake-heads have been thus placed, the lower bearings will be shifted outwardly from brackets 43, so that the upper bearing faces on the outer members 36 of the lower bearing will underlies the brake heads and slidably support them. Bolts 51 will then be tightened to lock the lower bearing members in their extended or operative positions. Springs 55 will then be connected to the brake-beam and studs 57 for yieldingly holding the brake-shoes 22 out of contact with the wheels while permitting the brakes to be applied by the usual brake-shifting mechanism. In the application of the brakes, the bearing faces 27 and 28 will slide on and between the bearing-faces 32 of the upper bearings and the wear-plates 38 on the retractible lower bearings. When it is necessary to remove the brake-structure for repair or replacement, the bolts 51 are loosened, the lower bearings are slidably retracted to clear the brake-heads and springs 55 are unhooked from the brake-beams or studs 57, so the entire brake-beam structure can be dropped from the truck.

In the form of the invention illustrated in Figs. 8ᵃ to 12, the upper bearing for the brake-head is similar in construction to that shown in Figs. 1 and 3, and the brake-head is detachably coupled to a lower support 59 which is slidably mounted in the supporting bracket 43 on the side frame for clearance of the brake-structure when it is to be dropped or mounted in its operative position. The lower support has a forked outer end 60 which straddles the lower rib 30 on the brake-head and is detachably connected to move therewith by a coupling pin 61 which extends through registering holes in said rib and forked end. This lower support 59 comprises an integral flat stem 42' with a depending longitudinal rib 46', which slidably fits in the T-shaped channel formed by upper and lower walls 44, 45 and ribs 47 of the bracket 43, and also on the outward extension of lower wall 45 of said bracket. An abutment or lug 64 with a trunnion 65 is integrally formed on and projects from the inner side of support 59 and opposed abutment 66 with a socket 67 is fixedly secured to the underside of bracket 43. A coil spring 68 is interposed between lug 64 and abutment 66 and urges the support 59 and the brake-head, and the brake-shoe, away from its adjacent car wheel. The movement of the brake-head away from the car wheel is limited by engagement of said head at 69 with the faces 32. In this construction the spring 68, when the support 59 is uncoupled from the brake-head, holds said support retracted so the brake-structure can be placed in operative position or dropped. When the brake-head is coupled to the support 59, spring 68 will urge the brake-shoe away from the car wheel 15 until preponderent counter-force is applied to the brake structure by the brake-setting appliances. For removing the brake-beam structure it is only necessary to withdraw the coupling pins 61 from the webs 30 on the brake-heads. The springs 68 will then retract the supports 59 for clearance in dropping the brake-beam structure. In replacing said structure on the truck, it is lifted until the brake-head engages faces 32 and the supports 59 are moved under the brake-heads against the force of springs 68, and the pins 61 are inserted through the holes in the forked ends of said supports and the webs 30 on the heads.

The invention exemplifies a device for sliding and demountably supporting a brake-beam structure in the truck which is simple in construction and permits expeditious placement and mounting in the truck and its removal therefrom.

The invention is not to be understood as restricted to the details set forth, since these may be modified within the scope of the appended claims without departing from the spirit and scope of the invention.

Having thus described the invention, what I claim as new and desire to secure by Letters Patent is:

1. The combination with a railway truck structure, embodying a side-frame, a brake-beam structure including a brake-beam, a brake-shoe head, provided with an upper slide-bearing face, and a brake-shoe; of means slidably and demountably supporting the brake-beam structure in the truck, comprising an upper bearing on the inner side of the side-frame for the upper bearing-face on the head, a transversely extending inward extension on the side frame, and a lower support for the brake-beam structure carried by said inward extension and retractable longitudinally of the side frame, for movement to permit clearance of the head so the brake-beam structure may be dropped from the truck.

2. The combination with a railway truck structure embodying a side-frame, a transverse plank supported in the side-frame, a brake-beam structure including a brake-beam and a brake-shoe head provided with an upper slide-bearing face, and a brake-shoe; of means slidably and demountably supporting the brake-beam structure in the truck, comprising an upper bearing on the inner side of the side-frame for the upper bearing-face on the head, a transversely inward extension under the plank and integral with the side frame, and a lower support for the brake-beam structure carried by said inward extension and retractable longitudinally of the side-frame, for movement to permit clearance of the head so the brake-beam structure may be dropped from the truck.

3. The combination with a railway truck structure embodying a side-frame, a brake-beam structure including a brake-beam and a brake-shoe head, provided with an upper slide-bearing face, and a brake-shoe; of means for slidably and demountably supporting the brake-beam structure in the truck, comprising, an upper bearing on the inner side of the side-frame for the upper bearing-face on the head, a transversely inward extension on the side frame provided with a channel and a lower support for the brake-beam structure slidably mounted in the channel in said inward extension, for movement to permit clearance of the head so the brake-beam structure may be dropped from the truck.

4. In a railway truck structure, the combination with a side-frame, a transverse plank supported in the side-frame, a brake-beam structure including a beam and a brake-shoe head adjacent one end of the beam, provided with upper and lower slide-bearing faces, and with a brake shoe; of means for slidably and demountably supporting the brake-beam structure in the truck, comprising an upper bearing on the inner side of the side frame, disposed transversely inwards thereof, and for the upper bearing-face on the head, a transversely inward extension on the side frame and under the plank, a lower bearing for the lower bearing face on the head, mounted on said extension for retractile movement longitudinally of the side-frame, for movement to permit clearing the head so the brake-beam structure may be dropped from the truck, and means between the extension and the lower bearing for securing the lower bearing in its operative position to slidably support the head.

5. In a railway truck structure, the combination with a side-frame, a brake beam structure including a beam and a brake-shoe head adjacent one end of the beam, provided with upper and lower slide-bearing faces, and with a brake shoe; of means for slidably and demountably supporting the brake-beam structure in the truck, comprising an upper bearing integral with the side frame, disposed transversely inwards thereof, and for the upper bearing-face on the head, an integral transversely inward extension on the side frame, a lower bearing for the lower bearing face on the head, mounted on said extension for retractile movement longitudinally of the side-frame, for movement to permit clearing the head so the brake-beam structure may be dropped from the truck, and means for securing the lower bearing in its operative position to slidably support the head.

6. In a railway truck structure, the combination with a side-frame, a transverse plank supported in said side-frame a brake beam structure including a beam and a brake-shoe head adjacent one end of the beam, provided with upper and lower slide-bearing faces, and with a brake shoe; of means for slidably and demountably supporting the brake-beam structure in the truck, comprising an upper bearing on the side frame, disposed transversely inwards thereof, and for the upper bearing-face on the head, a bracket extending transversely inward of and on the side frame and under the plank, a lower bearing for the lower bearing face on the head, slidably mounted on said bracket for retractile movement longitudinally of the side-frame, for movement to permit clearing the head so the brake-beam structure may be dropped from the truck, and means for securing the lower bearing in its operative position to slidably support the head.

7. In a railway truck structure, the combination with a side-frame, a brake beam structure including a beam and a brake-shoe head adjacent one end of the beam, provided with upper and lower slide-bearing faces, and with a brake shoe; of means for slidably and demountably supporting the brake-beam structure in the truck, comprising an upper bearing integral with the side frame, disposed transversely inwards thereof, and for the upper bearing-face on the head, a bracket transversely inward of and integral with the side frame, a lower bearing for the lower bearing face on the head slidably mounted in said bracket for retractile movement longitudinally of the side-frame, for movement to permit clearing the head so the brake-beam structure may be dropped from the truck, and means for securing the lower bearing in the bracket and its operative position to slidably support the head.

8. In a railway truck structure, the combination with a side-frame, a brake beam structure including a beam and a brake-shoe head adjacent one end of the beam, provided with upper and lower slide-bearing faces, and with a brake shoe; of means for slidably and demountably supporting the brake-beam structure in the truck, comprising an upper bearing on the side frame, disposed transversely inwards thereof, and for the upper bearing-face on the head, a bracket transversely inward of and on the side frame, and having a channel therein, a lower bearing for the lower bearing face on the head, provided with a member slidably mounted in the channel in said bracket for movement to permit clearing the head so the brake-beam structure may be dropped from the truck, and means for securing the lower bearing in its operative position to slidably support the head.

9. In a railway truck structure, the combination with a side-frame, a brake beam structure including a beam and a brake-shoe head adjacent one end of the beam, provided with upper and lower slide-bearing faces, and with a brake shoe; of means for slidably and demountably supporting the brake-beam structure in the truck, comprising an upper bearing on the side frame, disposed transversely inwards thereof, and for the upper bearing-face on the head, a bracket transversely inward of and on the side frame, and having a channel therein, a lower bearing for the lower bearing face on the head, provided with a member slidably mounted in the channel in said bracket for movement to permit clearing the head so the brake-beam structure may be dropped from the said truck, said member and said bracket having interfitting ribs.

10. In a railway truck structure, the combination with a side frame, and a brake-beam structure including a beam, a brake-shoe head adjacent one end of the beam, and upper and lower slide-bearing faces, of means for slidably and demountably supporting the structure, comprising a transversely inward integral extension on the side-frame provided with a bearing for the upper bearing face on the beam structure, a second transversely inward integral seat extension on the side frame, a bracket provided with a channel, and at the inner end of said seat-extension, a bearing for the lower bearing face on the beam structure, including a member slidably mounted in said channel for retractably mounting the lower bearing, for movement to permit clearing the beam-structure so it may be dropped from the truck, and means for locking the lower bearing in its operative position.

11. In a railway truck structure, the combination with a side frame, and a brake-beam structure including a beam, a brake-shoe head adjacent one end of the beam, and upper and lower slide-bearing faces, of means for slidably and demountably supporting the structure, comprising a transversely inward integral extension on the side-frame provided with a bearing for the upper bearing face on the beam structure, a second transversely inward integral seat extension on the side frame, a bracket provided with a channel, and at the inner end of said seat-extension, a bearing for the lower bearing face on the beam structure, including a member slidably mounted in said channel, for retractably mounting the lower bearing, for movement to permit clearing the beam-structure so it may be dropped from the truck, said bracket and said member being provided with interfitting guide ribs.

12. In a railway truck structure, the combination with a side-frame, a brake beam structure including a beam and a brake-shoe head adjacent one end of the beam, provided with upper and lower slide-bearing faces, and with a brake shoe; of means for slidably and demountably supporting the break-beam structure in the truck, comprising an upper bearing on the inner side of the frame, disposed transversely inwards thereof, and for the upper bearing face on the head, a transversely inward extension on the side frame, a lower bearing for the lower bearing face on the head, mounted on said extension for movement longitudinally of the side frame, for movement to permit clearing the head so the brake-beam structure may be dropped from the truck, a spring between the lower bearing and the extension, and releasable for the removal of said structure.

13. In a railway truck structure, the combination with a side frame, and a brake-beam structure including a beam, a brake-shoe head adjacent one end of the beam, and upper and lower slide-bearing faces; or means for slidably and demountably supporting the beam-structure, comprising a bearing on the inner side of the side-frame for the upper bearing face on the srtucture, a second transversely inward extension on the side frame, a bearing for the lower bearing face on the beam structure mounted on said second extension for retractile movement longitudinally of the side-frame for movement to permit clearing the beam-structure so it may be dropped from the truck, a spring between the bearing for the lower face on the beam structure and the second extension, and releasable for the removal of said structure.

14. The combination with a railway truck structure embodying a side-frame, a brake-beam structure including a brake-beam and a brake-shoe head provided with an upper slide bearing face and a brake shoe; of means for slidably and demountably supporting the brake-beam structure in the truck, comprising, an upper bearing on the inner side of the side-frame for the upper bearing face on the head, a transversely inward extension on the side frame, a lower support for the brake head, slidably mounted in said extension for retractile movement longitudinally of the side-frame, and means to permit detachably connecting the lower support to said head, for retraction of the lower support to clear the head so the brake beam structure may be dropped from the truck.

15. The combination with a railway truck structure embodying a side-frame, a brake-beam structure including a brake-beam and a brake-shoe head provided with an upper slide bearing face and a brake shoe; of means for slidably and demountably supporting the brake-beam structure in the truck, comprising, an upper bearing on the inner side of the side-frame for the upper bearing face on the head, a transversely inward extension on the side frame, a lower support for the brake-head, slidably mounted in said extension for retractile movement longitudinally of the side-frame, and a pin for detachably connecting the lower support to the head, for retraction of the lower support to clear the head so the brake beam structure may be dropped from the truck.

16. The combination with a railway truck structure embodying a side-frame, a brake-beam structure including a brake-beam and a brake-shoe head provided with an upper slide bearing face and a brake-shoe; of means for slidably and demountably supporting the brake-beam structure in the truck, comprising, an upper bearing on the inner side of the side-frame for the upper bearing face on the head, a transversely inward extension on the side frame, a lower support for the brake head, slidably mounted in said extension for retractile movement longitudinally of the side-frame, means for permitting detachably connecting the lower support to the head, for retraction of the lower support to clear the head so the brake beam structure may be dropped from the truck, and spring-means between the extension and the lower support for retracting the lower support.

WILLIAM H. SALE.

REFERENCES CITED

The following references are of record in the file of this patent:

UNITED STATES PATENTS

| Number | Name | Date |
| --- | --- | --- |
| 2,226,551 | Busse | Dec. 31, 1940 |
| 2,254,513 | Busse | Sept. 2, 1941 |